United States Patent
Berube et al.

(10) Patent No.: US 12,504,096 B2
(45) Date of Patent: Dec. 23, 2025

(54) TWO POSITION FEEDBACK VALVE

(71) Applicant: Hamilton Sundstrand Corporation, Charlotte, NC (US)

(72) Inventors: Connor Berube, York Beach, ME (US); Myles R. Kelly, Willimantic, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 179 days.

(21) Appl. No.: 18/371,748

(22) Filed: Sep. 22, 2023

(65) Prior Publication Data

US 2025/0102076 A1 Mar. 27, 2025

(51) Int. Cl.
*F16K 37/00* (2006.01)
*F16K 27/02* (2006.01)

(52) U.S. Cl.
CPC .......... *F16K 37/0041* (2013.01); *F16K 27/02* (2013.01)

(58) Field of Classification Search
CPC .............................. F16K 37/0041; F16K 27/02
See application file for complete search history.

(56) References Cited

U.S. PATENT DOCUMENTS

| 6,112,765 | A | 9/2000 | Boyer |
| 7,237,535 | B2 | 7/2007 | Eick et al. |
| 7,762,080 | B2 | 7/2010 | Anson et al. |
| 10,228,670 | B2 | 3/2019 | Swope |
| 2022/0146284 | A1* | 5/2022 | Hayakawa ............... G01D 5/14 |

FOREIGN PATENT DOCUMENTS

| DE | 857879 | C | 12/1952 |
| DE | 102004052005 | A1 | 5/2006 |
| DE | 102018008565 | A1 | 4/2020 |
| WO | WO-2010130021 | A1 * | 11/2010 ............... F16K 11/07 |

OTHER PUBLICATIONS

Extended European Search Report for EP Application No. 24201897.6, Dated Jan. 31, 2025, pp. 9.

* cited by examiner

Primary Examiner — Angelisa L. Hicks
(74) Attorney, Agent, or Firm — Kinney & Lange, P.A.

(57) ABSTRACT

A valve system includes a valve body defining an inlet, an outlet, and a flow path connecting the inlet in fluid communication with the outlet through one or more flow paths through the valve body. A poppet is slidingly engaged to the valve body for movement along an axis, between a first position allowing flow though the flow path, and a second position blocking flow the flow path. An electrical circuit makes a path through the valve body. A controller is operatively connected to the electrical circuit, configured to monitor electrical resistance of the electrical circuit and to output a signal indicative of open or closed state of the valve based on whether electrical resistance of the electrical circuit is at a first level or at a second level.

20 Claims, 5 Drawing Sheets

TWO POSITION FEEDBACK VALVE

BACKGROUND

1. Field

The present disclosure relates to valves, and more particularly to generating feedback indicative of valve state.

2. Description of Related Art

Typical engine controllers need feedback on the status of valves in the engine. Traditionally, the status of a given valve is derived from pressure transducers in the line downstream from the valve. The conventional techniques have been considered satisfactory for their intended purpose. However, there is an ever present need for improved systems and methods for generating the positional feedback for a valve, e.g. without the need for additional components traditionally needed to provide the positional feedback. This disclosure provides a solution for this need.

SUMMARY

A valve system includes a valve body defining an inlet, an outlet, and a flow path connecting the inlet in fluid communication with the outlet through one or more flow paths through the valve body. A poppet is slidingly engaged to the valve body for movement along an axis, between a first position allowing flow though the flow path, and a second position blocking the flow path. An electrical circuit makes a path through the valve body. A controller is operatively connected to the electrical circuit, configured to monitor electrical resistance of the electrical circuit and to output a signal indicative of open or closed state of the valve based on whether electrical resistance of the electrical circuit is at a first level or at a second level.

The electrical path through the valve body can be configured to electrically connect two electrical contacts of the electrical circuit with the poppet in the first position, setting electrical resistance of the electrical circuit to the first level. The controller can be configured to output a signal indicative of the poppet being in the first position if the controller detects electrical resistance of the electrical circuit at the first level. The electrical path through the valve body can be configured so that with the poppet in the second position, two electrical contacts of the electrical circuit are electrically disconnected so that the electrical resistance of the electrical circuit is set to the second level, wherein the second level is higher than the first level. The controller can be configured to output a signal indicative of the poppet being in the second position if the controller detects electrical resistance of the electrical circuit at the second level. The first level can be a lower resistance level than that of the second level.

The controller can be operatively connected to communicate valve state to an electronic engine control (EEC). The EEC can be configured to control operation of an engine based on feedback indicative of valve position from the controller. The controller and EEC can be agnostic of specific position between the first and second positions of the poppet. The controller can be configured to conclude the flow path is closed unless the poppet is fully in the first position. The controller and EEC can be configured to determine state of the poppet without input from any pressure sensors in fluid communication with the valve body.

A biasing member can be engaged to the housing and to the poppet, configured to bias the poppet toward the first position. The housing can include a first housing portion that houses the biasing member, a second housing portion that defines the flow path therethrough, and a bushing connecting between the first housing portion and the second housing portion. A first leg of the electrical path can extend through the first housing portion and can end at a first electrical contact. A second leg of the electrical path can extend through the bushing and into the second housing portion. The controller can be operatively connected to each of the first leg and the second leg to measure voltage across the first and second legs.

The controller can include a voltmeter configured to determine voltage between first and second nodes. The first node of the voltmeter can be electrically connected to the first leg of the circuit. The second node of the voltmeter can be connected to the second leg of the circuit. One of the first and second nodes can be electrically connected to a voltage source. The other of the first and second nodes can be electrically connected to ground.

The controller can include logic configured to convert readings from the voltmeter into an open/close binary status feedback signal to an electronic engine control (EEC). It is also contemplated that the controller can be configured to communicate a voltage feedback signal from the voltmeter to an electronic engine control (EEC). The EEC can include logic to convert the voltage feedback signal into positional feedback indicative of state of the poppet for use in engine control.

A method includes monitoring resistance across two electrical nodes in a valve body of a valve, detecting a change in the resistance, and outputting feedback indicative of a change of state of the valve. The change in resistance can be due to a change in an electrical path based on the position of a poppet.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
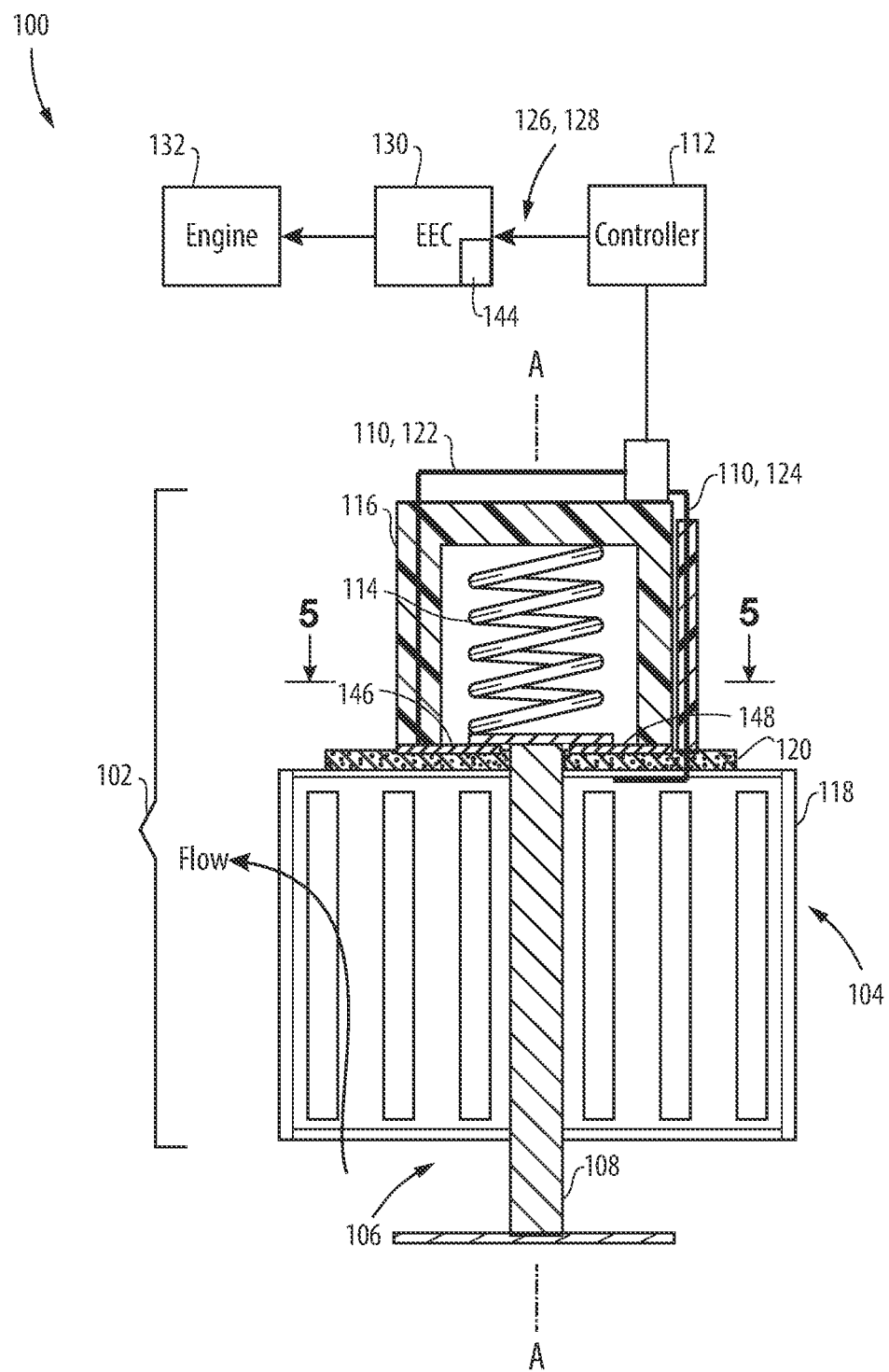
FIG. 1 is a schematic view of an embodiment of a system constructed in accordance with the present disclosure, showing the poppet in the open state.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-5, as will be described. The systems and methods described herein can be used to generate feedback indicative of valve state without the need for additional components such as pressure transducers downstream of the valves.

Figure 2:
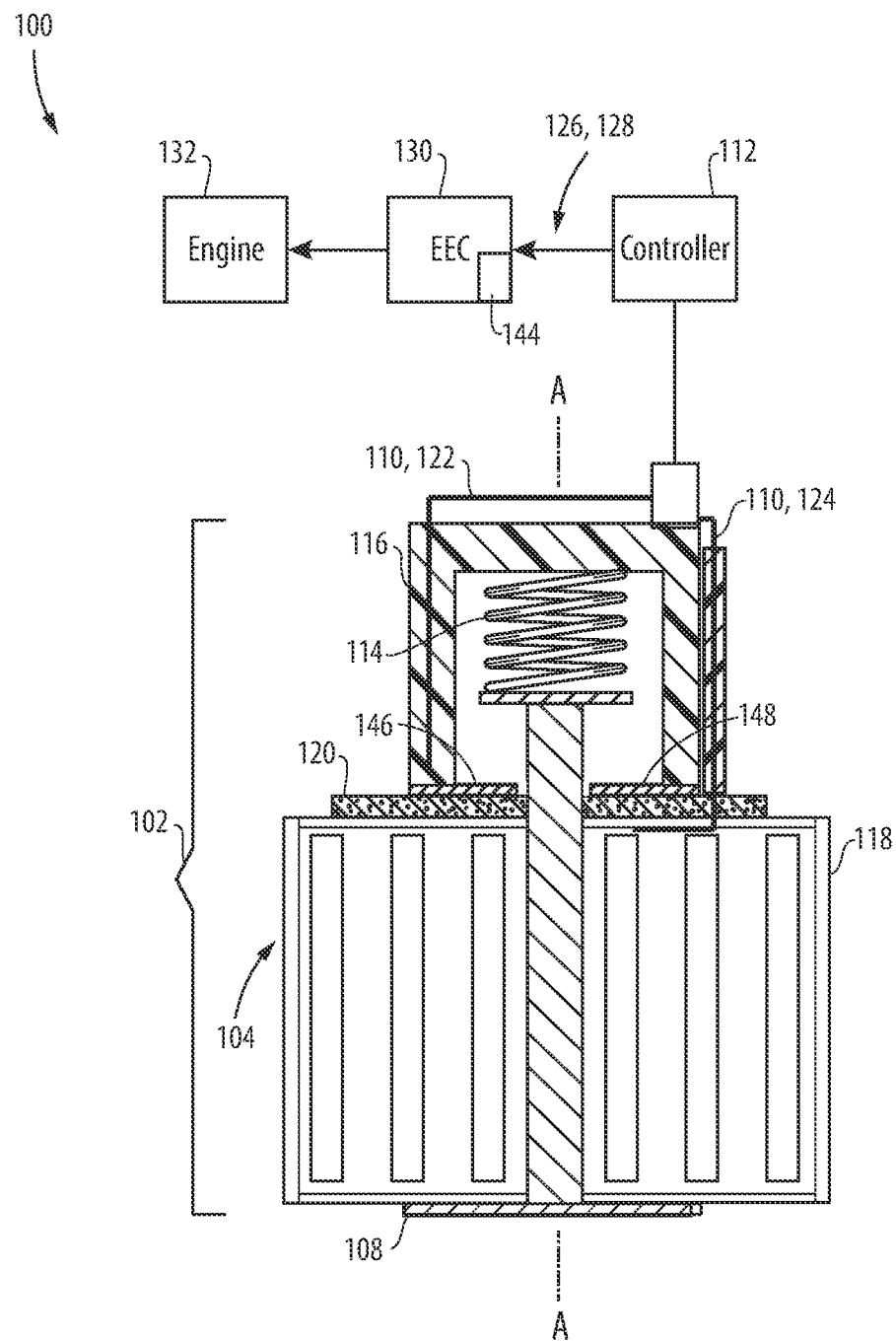
FIG. 2 is a schematic view of the system of FIG. 1, showing the poppet in the closed state.

The valve system 100 includes a valve body 102 defining an outlet 104, an inlet 106, and a flow path, indicated in FIG. 1 by the flow arrow, connecting the outlet 104 in fluid communication with the inlet 106 through one or more pathways through the valve body 102. A poppet 108 is slidingly engaged to the valve body 102 for movement along an axis A, between a first position allowing flow though the flow path as shown in FIG. 1, and a second position blocking flow the flow path as shown in FIG. 2. An electrical circuit 110 makes a path through the valve body 102. A controller 112 is operatively connected to the electrical circuit 110, configured to monitor electrical resistance of the electrical circuit 110 and to output a signal indicative of open or closed state of the valve based on whether electrical resistance of the electrical circuit 110 is at a first level or at a second level.

Figure 5:
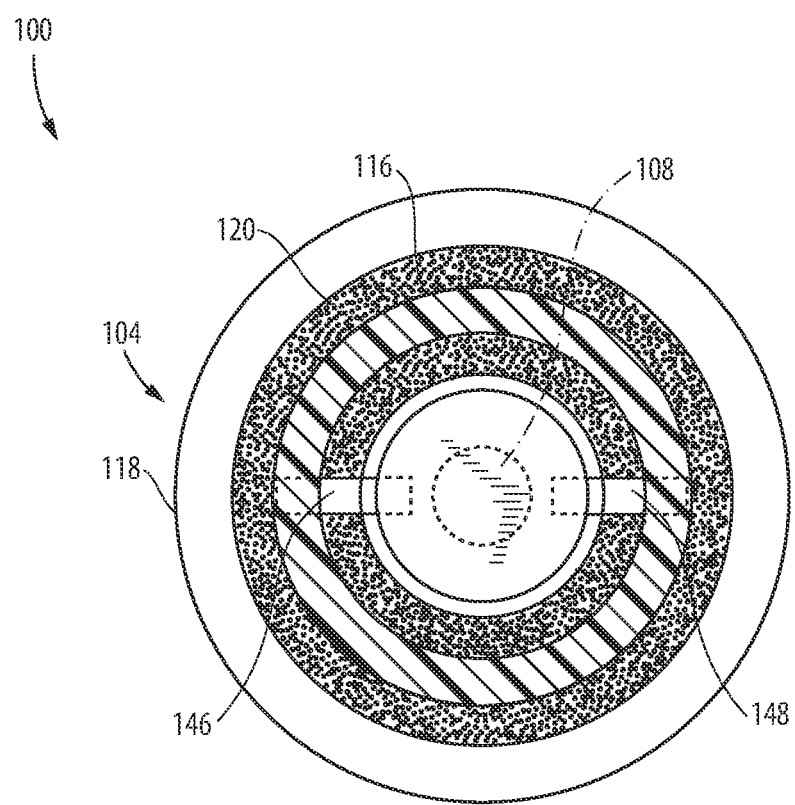
FIG. 5 is a schematic axial cross sectional view of the system of FIG. 1, showing the poppet and electrical contacts in the valve body.

A biasing member 114 is engaged to the housing 102 and to the poppet 108, configured to bias the poppet 108 toward the first position shown in FIG. 1, so in the extended state in the absence of any pressure the biasing member 114 holds the flow path open. Pressure acting on the flow path of the valve can act on the poppet 108 to move the poppet 108 against the bias to the closed position shown in FIG. 2. In other configurations, a cam or other mechanism can actuate the poppet 108 against the bias. The housing 102 includes a first housing portion 116 that houses the biasing member 114, a second housing portion 118 that defines the flow path therethrough. A carbon bushing 120 mechanically connects and electrically separates between the first housing portion 116 and the second housing portion 118. Two conductive terminals 146 and 148 are located on top of the carbon bushing 120 inside of the first housing portion 116. The terminals 146, 148 are also shown in FIG. 5. The terminals 146, 148 are in a position where they are physically touching and in electrical contact with the upper portion of the poppet 108 when the valve is in the open position shown in FIG. 1, wherein electrical contact for both of the contacts 146, 148 with the poppet 108 is broken with the poppet 108 in the second position shown in FIG. 2 or with the poppet 108 in transition between the first position shown in FIG. 1 and the second position shown in FIG. 2. A first leg 122 of the electrical path 110 extends through the first housing portion 116 and ends at the conductive terminal 146. A second leg 124 of the electrical path 110 extends outside of the first hosing portion 116, through the bushing 120, and into the second housing portion 118. The controller 112 is operatively connected to each of the first leg 122 and the second leg 124 to measure resistance across the first and second legs 122, 124.

Figure 3:
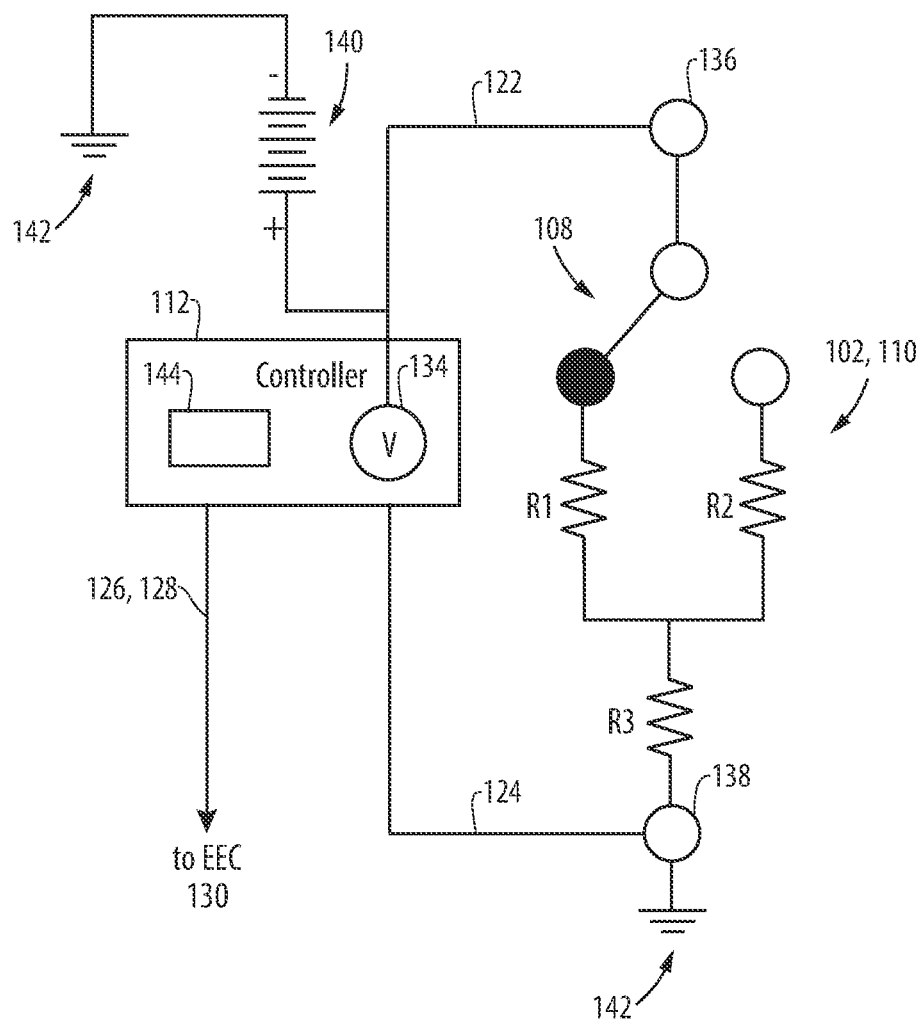
FIG. 3 is an electrical circuit schematic view of the system of FIG. 1, schematically indicating the electrical resistance of the valve circuit in the valve state of FIG. 1.
Figure 4:
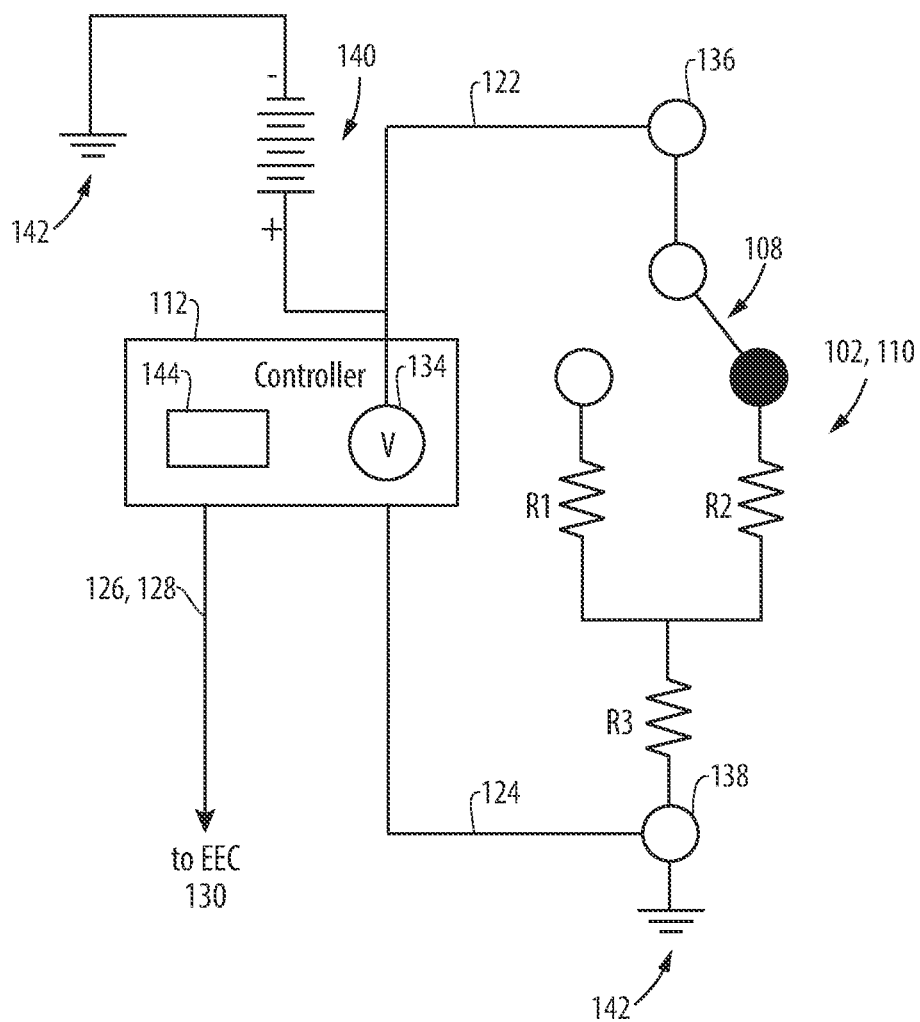
FIG. 4 is an electrical circuit schematic view of the system of FIG. 2, schematically indicating the electrical resistance of the valve circuit in the valve state of FIG. 2.

The electrical path through the valve body 102 is configured to have a certain lower resistance level when the poppet 108 is contacting the conductive terminals 146 and 148 in the first position of FIG. 1, setting electrical resistance of the electrical circuit to the first level, R1 as indicated schematically of FIG. 3. The controller 112 is configured to output a signal 126 indicative of the poppet 108 being in the first position, i.e. valve open, if the controller 112 detects electrical resistance of the electrical circuit 110 at the first level R1. The electrical path through the valve body is configured so that with the poppet 108 in the second position of FIG. 2, without fluid passing through the flow path, the electrical resistance of the electrical circuit 110 is set to a to the second level R2 as indicated in FIG. 4, where the poppet 108 is schematically indicated as a switch connecting R2 in the circuit 110 relative to connecting R1 as shown in FIG. 3. This second level of resistance R2 is higher than the first level of resistance R1 because the poppet 108 is not in physical and electrical contact with the conductive terminals 146, 148. The controller 112 is configured to output a signal 128 indicative of the poppet 108 being in the second position, i.e. valve closed, if the controller 112 detects electrical resistance of the electrical circuit 110 at the second level R2. The two resistance levels R1 and R2 need to be inequal so that the controller 112 can distinguish. For instance, the first level R1 can be a lower resistance level than that of the second level R2.

The controller 112 is operatively connected to communicate valve state, e.g. with signals 126, 128, to an electronic engine control (EEC) 130. The EEC 130 is operatively connected to control operation of an engine 132 based on feedback, e.g. signals 126, 128, indicative of valve position from the controller 112. The controller 112 and EEC 130 are agnostic of specific poppet positions when the poppet 108 is between the fully open and fully closed first and second positions shown in FIGS. 1 and 2, and the resistance level R2 generally indicates that the valve is not fully open, so the controller 112 can conclude when the poppet 108 is contacting the terminals 146, 148 the valve is fully open as shown in FIG. 1, and otherwise can conclude the valve is closed even if it is not fully open or fully closed. The controller 112 and EEC 130 are configured to determine state of the poppet 108 without input from any pressure sensors in fluid communication with the valve body 102, i.e. this can eliminate the need for the traditional downstream pressure transducers.

With reference now to FIGS. 3-4, the controller 112 includes a voltmeter 134 configured to determine voltage between first and second nodes 136, 138 of the circuit 110. The first node 136 of the voltmeter is electrically connected to the first leg 122 of the circuit 110. The second node 138 of the voltmeter 134 is connected to the second leg 124 of the circuit 110. One of the first and second nodes 136, 138 is electrically connected to a voltage source 140 such as a battery or bus, and wherein the other of the first and second nodes 136, 138 is electrically connected to local or general ground 142. A third resistance R3 can be included in the circuit 110 or controller 112 to facilitate the voltage measurements. Those skilled in the art will also readily appreciate that the resistance level can be inferred from current measurements by the controller 112 instead of in addition to voltage measurements.

The controller 112 includes logic 144 configured to convert readings from the voltmeter 134 into an open/close binary status feedback signals 126, 128 to the EEC 130. It is also contemplated that some or all of the logic 144 can be located in the EEC 130, wherein the controller 112 is configured to communicate a raw voltage or current feedback signal from the voltmeter 134 (and/or a current meter) to the EEC 130, wherein the EEC 130 uses its logic 144 to convert the voltage feedback signal into positional feedback indicative of state of the poppet 108 for use in engine control. The logic 144 can take any suitable form such as machine readable instructions configured to cause a processor to perform methods as disclosed herein, solid state digital logic components, analog circuit components, or any suitable combination thereof. Moreover, those skilled in the art will readily appreciate that the controller 112 can be separate from the EEC 130, e.g. incorporated in the valve itself, or can be incorporated in the EEC 130.

A method includes monitoring resistance across two electrical nodes, e.g. nodes 136, 138, in a valve body 102 of a valve, detecting a change in the resistance, e.g. R1 changing to R2 or vice versa, and outputting feedback indicative of a change of state of the valve. The change in resistance can be due to a change in flow of fluid through the valve, movement of a poppet, or the like. Based on the resistance measurement, the valve can relay the position of the valve (either open or closed) back to the EEC 130. The difference in materials of the location where resistance measurements are taken allow the valve to output one measurement (R1) if the valve is open (state 1) due to the decreased resistance path and a different measurement (R2) if the valve is closed (State 2) due to the increased resistance path.

Systems and methods as disclosed herein provide potential benefits including the following. They can integrate positional feedback into the valve itself and eliminate the need for downstream electrical pressure sensors which currently are used to denote valve position based on a pressure reading downstream.

The methods and systems of the present disclosure, as described above and shown in the drawings, provide for generation of feedback indicative of valve state without the need for additional components such as pressure transducers downstream of the valves. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A valve system comprising:
    a valve body defining an inlet, an outlet, and a flow path connecting the inlet in fluid communication with the outlet through one or more pathways through the valve body, the valve body comprising:
        a first housing portion;
        a second housing portion defining the flow path therethrough; and
        a bushing disposed between the first housing portion and the second housing portion;
    a poppet slidingly engaged to the valve body for movement along an axis, between a first position allowing flow though the flow path, and a second position blocking the flow path; and
    an electrical circuit making a path through the valve body; and
    a controller operatively connected to the electrical circuit, configured to monitor electrical resistance of the electrical circuit and to output a signal indicative of open or closed state of the valve based on whether electrical resistance of the electrical circuit is at a first level or at a second level;
    wherein a first leg of the electrical path extends through the first housing portion and ends at the first electrical contact.

2. The system as recited in claim 1, wherein the electrical path through the valve body is configured to electrically connect two electrical contacts of the electrical circuit with the poppet in the first position, setting electrical resistance of the electrical circuit to the first level, wherein the controller is configured to output a signal indicative of the poppet being in the first position if the controller detects electrical resistance of the electrical circuit at the first level.

3. The system as recited in claim 1, wherein the electrical path through the valve body is configured so that with the poppet in the second position, two electrical contacts of the electrical circuit are electrically disconnected so that the electrical resistance of the electrical circuit is set to the second level, wherein the second level is greater than the first level, wherein the controller is configured to output a signal indicative of the poppet being in the second position if the controller detects electrical resistance of the electrical circuit at the second level.

4. The system as recited in claim 1, wherein the first level is a lower resistance level than that of the second level.

5. The system as recited in claim 1, wherein the controller is operatively connected to communicate valve state to an electronic engine control (EEC).

6. The system as recited in claim 5, wherein the EEC is configured to control operation of an engine based on feedback indicative of valve position from the controller.

7. The system as recited in claim 6, wherein the controller and EEC are agnostic of specific position between the first and second positions of the poppet.

8. The system as recited in claim 7, wherein the controller is configured to conclude the flow path is closed unless the poppet is fully in the first position.

9. The system as recited in claim 6, wherein the controller and EEC are configured to determine state of the poppet without input from any pressure sensors in fluid communication with the valve body.

10. The system as recited in claim 1, further comprising a biasing member engaged to the valve body and to the poppet, configured to bias the poppet toward the first position, wherein the biasing member is housed within the first housing portion.

11. A valve system comprising:
    a valve body defining an inlet, an outlet, and a flow path connecting the inlet in fluid communication with the outlet through one or more pathways through the valve body, the valve body comprising:
        a first housing portion;
        a second housing portion defining the flow path therethrough; and
        a bushing disposed between the first housing portion and the second housing portion;
    a poppet slidingly engaged to the valve body for movement along an axis, between a first position allowing flow though the flow path, and a second position blocking the flow path; and
    a biasing member housed within the first housing portion, wherein the biasing member engages the valve body and the poppet and is configured to bias the poppet toward the first position;
    an electrical circuit making a path through the valve body; and
    a controller operatively connected to the electrical circuit, configured to monitor electrical resistance of the electrical circuit and to output a signal indicative of open or closed state of the valve based on whether electrical resistance of the electrical circuit is at a first level or at a second level;
    wherein a first leg of the electrical path extends through the first housing portion and ends at the first electrical contact within the first housing portion;
    wherein a second leg of the electrical path extends through the bushing and into the second housing portion.

12. The system as recited in claim 11, wherein the controller is operatively connected to each of the first leg and the second leg to measure voltage across the first and second legs.

13. The system as recited in claim 12, wherein the controller includes a voltmeter configured to determine a voltage between first and second nodes, wherein the first node of the voltmeter is electrically connected to the first leg of the circuit, and wherein the second node of the voltmeter is connected to the second leg of the circuit.

14. The system as recited in claim 13, wherein one of the first and second nodes is electrically connected to a voltage source, and wherein the other of the first and second nodes is electrically connected to ground.

15. The system as recited in claim 14, wherein the controller includes logic configured to convert readings from the voltmeter into an open/close binary status feedback signal to an electronic engine control (EEC).

16. The system as recited in claim 14, wherein the controller is configured to communicate a voltage feedback signal from the voltmeter to an electronic engine control (EEC), wherein the EEC includes logic to convert the voltage feedback signal into positional feedback indicative of state of the poppet for use in engine control.

17. A method comprising:
monitoring resistance across two electrical nodes in a valve body of a valve,
wherein the valve body comprises:
a first housing portion;
a second housing portion defining a flow path from an inlet to an outlet of the valve body; and
a bushing disposed between the first housing portion and the second housing portion;
wherein the valve includes a poppet slidingly engaged to the valve body for movement along an axis between a first position allowing flow though the flow path and a second position blocking the flow path;
detecting a change in the resistance of an electrical circuit making a path through the valve body, the electrical circuit comprising:
a first leg electrically connected to the first node that extends through the first housing portion and ends at a first electrical contact within the first housing portion; and
a second leg electrically connected to the second node that extends through the bushing and into the second housing portion; and
outputting feedback indicative of a change of state of the valve base on the poppet in the first position and in the second position.

18. The method as recited in claim 17, wherein the change in resistance is due to a change in an electrical path based on position of a poppet.

19. The valve system of claim 1, wherein the poppet engages the first electrical contact in the first position.

20. The valve system of claim 11, wherein the poppet engages the first electrical contact in the first position.

* * * * *